United States Patent
Kim et al.

(10) Patent No.: US 9,942,627 B2
(45) Date of Patent: Apr. 10, 2018

(54) DYNAMIC INFORMATION PRESENTATION BASED ON USER ACTIVITY CONTEXT

(71) Applicant: Intel Corporation, Santa Clara, CA (US)

(72) Inventors: Kahyun Kim, Hillsboro, OR (US); Paul F. Sorenson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 14/485,373

(22) Filed: Sep. 12, 2014

(65) Prior Publication Data

US 2016/0080838 A1 Mar. 17, 2016

(51) Int. Cl.
  *G08C 19/22* (2006.01)
  *H04Q 9/00* (2006.01)
  *H04W 4/00* (2018.01)

(52) U.S. Cl.
  CPC ........... *H04Q 9/00* (2013.01); *H04W 4/001* (2013.01); *H04W 4/006* (2013.01); *H04Q 2209/40* (2013.01); *H04W 4/008* (2013.01)

(58) Field of Classification Search
  CPC ....... H04Q 9/00; H04Q 2209/40; H04L 67/00
  USPC .................................................. 340/870.07
  See application file for complete search history.

(56) References Cited

U.S. PATENT DOCUMENTS

| | | | | |
|---|---|---|---|---|
| 6,466,232 B1* | 10/2002 | Newell | ................... | G06F 1/163 345/3.1 |
| 7,694,000 B2* | 4/2010 | Flores | .................... | G06Q 30/02 709/217 |
| 7,895,209 B2* | 2/2011 | Spence | ................. | G06F 9/4446 707/740 |
| 2012/0290950 A1* | 11/2012 | Rapaport | ............... | H04L 51/32 715/753 |
| 2013/0222521 A1* | 8/2013 | Lee | ........................ | H04N 7/142 348/14.02 |
| 2014/0052680 A1* | 2/2014 | Nitz | ......................... | G06N 5/02 706/46 |
| 2014/0114992 A1* | 4/2014 | Buford | ............. | G06F 17/30943 707/755 |

* cited by examiner

*Primary Examiner* — Steven Lim
*Assistant Examiner* — Mancil Littlejohn, Jr.
(74) *Attorney, Agent, or Firm* — Schwabe, Williamson & Wyatt, P.C.

(57) ABSTRACT

In embodiments, apparatuses, methods, and computer-readable media are described that are associated with a context-based information presentation system ("CIP"). The CIP may be configured to modify presentation of information to a user during performance of a physical activity. The CIP may be configured to receive information describing the physical activity and to identify a context for the physical activity based on the received information. The identification of the context may be performed through application of one or more context rules to the information describing the physical activity received by the CIP. The CIP may be configured to modify presentation of information to the user based on the identified context. Other embodiments may be described and claimed.

24 Claims, 8 Drawing Sheets

DYNAMIC INFORMATION PRESENTATION BASED ON USER ACTIVITY CONTEXT

TECHNICAL FIELD

The present disclosure relates to the field of data processing, in particular, to apparatuses, methods and storage media associated with presenting information to users performing physical activities.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Computing devices are increasingly used to provide information to users during physical activities, such as biking, running, hiking, driving, etc. For example, computing devices, such as Global Positioning Service ("GPS") devices, are used to provide navigation and routing information during performance of activities. In other examples, devices may provide information about the activity itself, such as heart rate information or energy expenditure. In yet another example, a device may provide training information, such as directing a person to bike or run at a particular pace for a given amount of time or distance before switching to a different pace.

In various scenarios, the information provided by these devices may be presented to users in different ways. For example, many devices, such as GPS devices, running watches, bike computers, smartphones, etc. may have a screen on which information may be presented visually. In other examples, information may be presented audibly, such as through attached or wireless headphones. In yet another example, the devices may interface with a separate visual presentation device. For example, a visual display may be attached to a user's helmet or glasses to allow the user a head-mounted mode of viewing information. In some scenarios, a bike computer, or other devices providing information about a physical activity, may interface with such a visual display to provide visual information.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
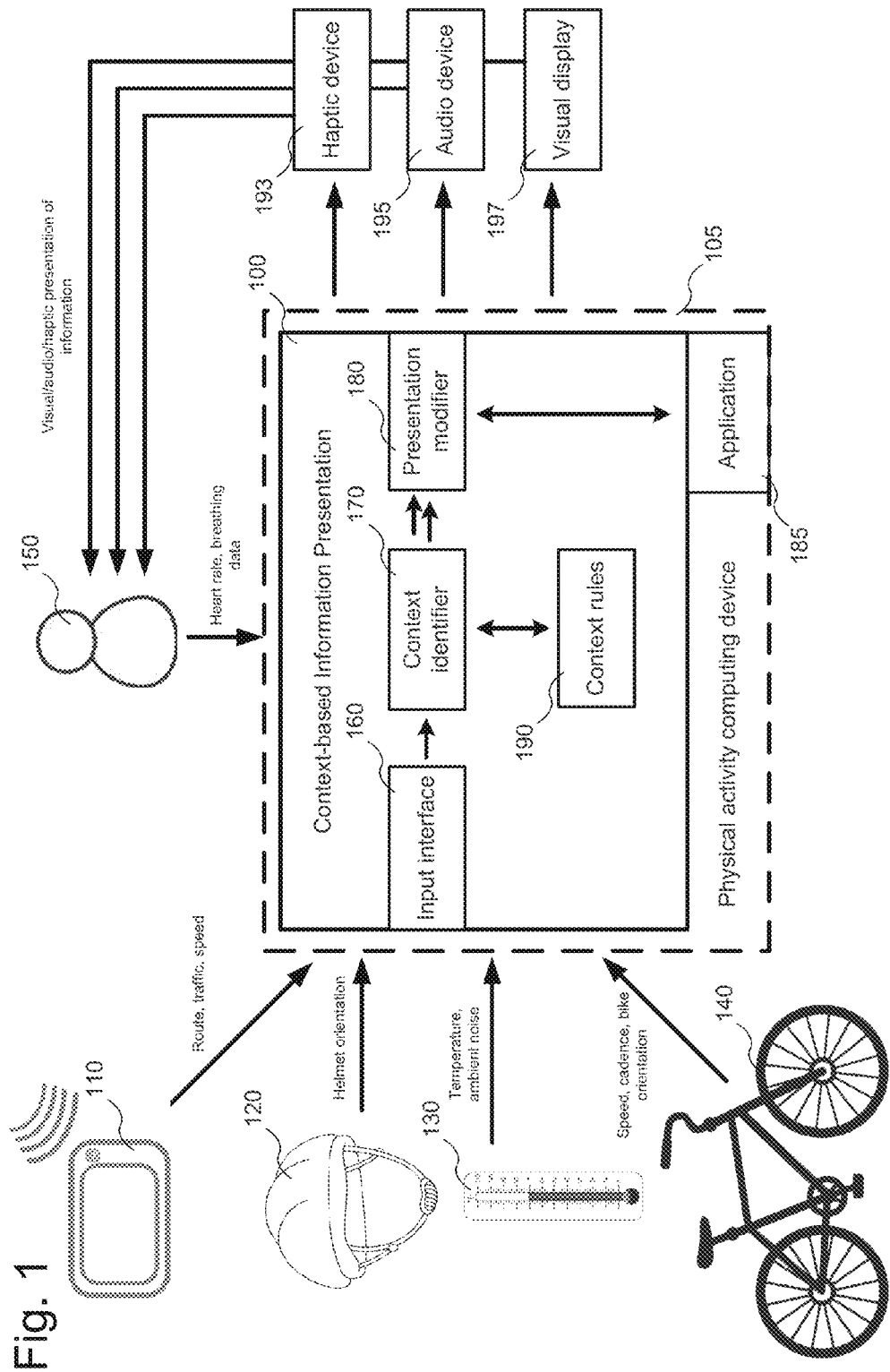
FIG. 1 illustrates an example arrangement for context-based information presentation, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

In various embodiments, a context-based information presentation system ("CIP") may be configured to modify presentation of information to a user during performance of a physical activity. In various embodiments, the presentation may be modified between various sensory modalities, such as visual presentation, auditory presentation, and/or haptic presentation. In various embodiments, the CIP may comprise or otherwise be associated with a computing device used to provide information to the user, such as, for example, a bike computer on a bicycle or a driving computer in a car. In various embodiments, the CIP may be configured to receive information describing a physical activity from a user, and to identify a context for the physical activity based on the received information. In some embodiments, the context may include an identification of an action the user is performing in relation to the physical activity. For example, if a user is riding a bicycle, the CIP may identify the user as looking for a turn while navigating. In other embodiments, the context may include an identification of a level of the physical activity. For example, the CIP may identify the user as pushing hard through a training program. In yet other embodiments, the context may include an identification of environmental conditions surrounding performance of the physical activity, such as ambient noise, weather, and/or moving through a tunnel. In various embodiments, the CIP may be configured to identify the context based on information received from one or more sensors. In various embodiments, the sensors maybe configured to measure one or more of: environmental data, physical data from the user, equipment data, and/or route/navigation data, as well as data from network- or cloud-based sources and data from other users or sensors associated with other users. In various embodiments, the identification of the context may be performed through application of one or more context rules to the information describing the physical activity received by the CIP.

As mentioned above, in various embodiments, the CIP may be configured to modify presentation of information to the user based on the identified context. The CIP may, in various embodiments, modify presentation of information between sensory modalities. For example, the CIP may modify presentation from a visual modality (such as on a screen of the bike computer or on a heads up display) to an auditory modality (such as spoken information delivered over headphones. In other embodiments, the CIP may modify presentation between haptic presentation and one of the other modalities as well, or between sensory modalities other than visual, auditory, and haptic.

In various embodiments, the type, amount, or speed, of information presented may be modified to accommodate cognitive or perceptual processing required by a current context. In one example, an amount or speed of information may be modified based on a speed the user is travelling, such that information may be presented faster or in simpler form before navigation or coaching events occur. In another example, if a user is participating in a particular mentally taxing activity, such as navigating a twisting and turning path, or heavy traffic, visual information may be reduced to that which may best be understood by the user, given that user's current heavy perceptual processing load. In yet other embodiments, the manner in which a piece of information is presented may be modified, such as, for example, by changing the color or area of a visual presentation or the volume or pitch of auditory presentation of an auditory presentation, or the vibration strength, length, or pattern of haptic feedback. In another example, in a coaching context, if a heart rate monitor data picks up the user being in high heart rate zone and the GPS indicates the terrain is uphill, the CIP may determine that the context further includes a particular difficult portion of the training, and may system activates auditory coaching (over visual coaching). Such auditory information may be further modified such that only simple data and count-down for the top of the hill information is given. If visual information is presented, such visual information may switch to simple UI indicating the most essential goal information.

In various embodiments, the CIP may be further configured to perform additional actions based on context. For example, in various embodiments, the CIP may implement context rules that cause particular actions to be performed outside of presentation of information, such as:

"When the user is training, do not pass phone calls or messages to the user, but store them for later perusal."

"If the user is in or near location X as indicated by GPS, then track speed and cadence through the next 1000 yards of movement—store this data on the bike computer as 'segment X data.'"

"If the user's position and other sensor data indicate the user is on winding roads with many turns, activate rear-facing camera and audio-tracking to identify ongoing, looming traffic (cars, trucks) and instigate appropriate warnings per settings."

Particular Examples of these and Other Embodiments are Described Herein.

Referring now to FIG. 1, an example arrangement for context-based information presentation is shown in accordance with various embodiments. In various embodiments, a context-based information presentation system system 100 ("CIP 100") may be configured to modify presentation of information to a user 150 during performance of a physical activity by the user. In various embodiments, the CIP 100 may be utilized association with various physical activities, such as cycling, running, hiking, walking, driving, etc. Additionally, while particular examples given herein may be presented in scenarios related to cycling, it may be recognized that various embodiments may be used with different physical activities.

In various embodiments, the CIP 100 may be associated with a physical activity computing device 105 ("PACD 105") which may be configured to provide information to the user 150 during performance of the physical activity, such as through operation of an application 185. For example, the CIP 100 may be included as part of a cycling computer that is attached to a bicycle and for which the application 185 may give information such as navigation data, speed, training information, etc. to a cyclist user 150. In another example, the CIP may be included in a running watch, or a smart phone equipped with training software. In various embodiments, the CIP 100 may control the computing device providing information in order to provide information that is more easily consumed by the user 150, thus improving the ability of the PACD 105 and the application 185 in providing information to aid the user 150 during performance of the physical activity. In various embodiments, the CIP 100 may be included in the PACD 105 (such as in the illustration of FIG. 1) or may be externally coupled to the PACD 105. In various embodiments, the application 185 may be external to the CIP 100 as illustrated; in other embodiments, the CIP 100 may be included in the application 185 itself (not illustrated). In some such embodiments, the CIP 100 may be configured to control presentation of information by the PACD 105 to the user 150 through one or more controls, such as through hardware or software controls, as may be understood. In various embodiments, the CIP 100, as well as the application 185, may be implemented in a separate networked device or server, such as a cloud-based networked device. In such embodiments, services may be provided to the user 150 by the application 185, and presentation of information from that application 185 may be performed, entirely outside of any physical device associated with the user 150. Information may instead be communicated via one or more networks, such as those described herein, to one or more presentation devices for presentation, as described below.

In various embodiments, the CIP 100 and/or PACD 105 may be coupled to one or more presentation devices, such as haptic device 193, visual display 195, and/or audio device 197 that may be configured to present information to a user. In various embodiments, the coupling between the CIP 100 and the haptic device 193, visual display 195, and/or audio device 197 may include one or more of a direct wired coupling, a wireless device-to-device and/or network coupling, and/or an intermediated coupling, such as through the physical activity computing device 105.

The haptic device 193 may, in various embodiments, include a device physically attached to and/or worn by the user 150 which may vibrate, poke, or otherwise physically stimulate the user 150 to present information. For example, the haptic device 193 may be configured to provide vibrations of various strengths, durations, and/or patterns to communicate information to the user 150. The visual display 195 may, in various embodiments, include a display physically attached to, or otherwise, connected to, the CIP 100 and/or PACD 105. In other embodiments, the visual display 195 may include a separate display, which may be wirelessly connected to the CIP 100 and/or PACD 105. In some embodiments, such a display may be attached to physical activity equipment, such as a bicycle or helmet. In other embodiments, the visual display 195 may be physically worn by the user 150, such as attached to or as a part of a pair of glasses, or as part of a watch. The visual display 195 may, in various embodiments, include various devices for presenting auditory information to the user 150, such as wired or wireless headphones or a speaker. In other embodiments, other forms for the visual display 195 and/or the audio device 197 may be used.

In various embodiments, the CIP 100 may be configured to receive data describing the physical activity of the user 150 from one or more sensors. This data may be used by the CIP 100 to identify the context of the physical activity. In various embodiments, the one or more sensors may include one or more GPS or other navigation sensors 110 that may measure and report on routing and navigation data, such as speed, route plan, traffic conditions, etc. In other embodiments, the one or more sensors may include one or more physical sensors 120 that may measure physical data about the user, such as heart rate, breathing rate, head orientation, skin conditions (such as galvanic resistance changes due to sweat) etc. In other embodiments, the one or more sensors may include one or more environmental sensors 130 that may measure environmental data, such as temperature, ambient noise, ambient light level and/or light and/or color in the viewing direction of the user 150. In yet other embodiments, the one or more sensors may include equipment sensors 140 that may measure equipment data, such as speed, gear choice, pedaling cadence, shoe strike position or cadence, breaking usage, etc. While particular examples of data are described above, it may be recognized that, in other embodiments, other types of sensors may be used or other types of data may be measured and used by the CIP 100.

In various embodiments, the CIP 100 may include one or more modules to facilitate context-based information presentation. In various embodiments, the CIP 100 may include an input interface 160, which may be coupled to the one or more sensors 110-140. The input interface 160 may be configured to receive the data describing the physical activity of the user 150 from the one or more sensors 110-140. In various embodiments, the input interface may be configured to accept data via an extendable interface, thus allowing for the addition of new sensors as equipment is changed or upgraded. The input interface may be configured to receive data describing the physical activity of the user 150 via various methods, including wired transmission, and/or wireless transmission via direct and/or networked communications.

Additionally, in various embodiments, the input interface 160 may be configured to receive data from sources other than those directly controlled or associated with the user 150. For example, the input interface may be configured to receive data information such as those above, but from among one or more additional participants in the physical activity (such as additional runners, cyclists, etc.). In various embodiments, the data may be communicated directly to the input interface 160 and/or may be communicated and compiled by various mesh or local networking technologies. Such technologies for communicating with the input interface may include, but are not limited to, Near Field Communication, Radio-frequency identification, Bluetooth, Bluetooth Low Energy, WiFI, WIFI-direct, etc. In various embodiments, the information may include data from sensor-arrays, verbal communication, or data about relative position within the group, speed, direction or other navigational data, and as well as other information. Additionally, in various embodiments, information received by the input interface 160 may include information obtained from one or more cloud sources, such as information regarding weather, traffic, road conditions, etc.

In various embodiments, the CIP 100 may also include a context identifier 170, which may be configured to receive the data describing the physical activity of the user 150 and, based on the received data, to identify one or more contexts for the physical activity. In various embodiments, the context identifier 170 may be configured to apply one or more context rules 190, which may help map particular sets or values of data to particular contexts. In various embodiments, the context rules may be stored locally as data at the CIP 100 (and/or the PACD 105). In other embodiments, the context rules 190 may be stored in firmware or hardware at the CIP 100 (and/or the PACD 105). In various embodiments, the CIP 100 may be configured to modify (or allow modification to) the context rules 190, such that the context rules 190 may be updated to provide better mapping to contexts or to work with new types of data representing the physical activity of the user 150.

In various embodiments, the CIP 100 may also include a presentation modifier 180 ("PM 180"), which may be configured to modify presentation of information to the user 150. In various embodiments the PM 180 may be configured to interact with the application 185 to modify presentation of information provided by the application 185. For example, in some embodiments, the PM 180 may be configured to send instructions and/or control codes to the application 185 to cause the application 185 to present information according to application of the content rules 190. In other embodiments, the PM 180 may be configured to receive information from the application 185 and to modify the information before providing the information, in modified form, to the various presentation devices, such as the haptic device 193, visual display 195, and/or audio device 197.

In various embodiments, the PM 180 may be configured to switch a mode of presentation of information to the user 150. For example, the PM 180 may be configured to cause information which was previously being presented visually to be presented in audio, such as when the context of the user 150's physical activity suggests the user 150 is visually distracted. In another example, the PM 180 may be configured to cause information which was previously being presented in audio to be presented visually, such as when the context suggests the user 150 is may not be able to hear audio information (for example, when the user 150 is in a noisy environment). In various embodiments, the PM 180 may be configured to modify visual presentation of information to the user 150. For example, the PM 180 may be configured to change size or color of visual information to make the information more visible to the user 150. In another example, the PM 180 may be configured to change the placement of the visual information, such as to center the visual information on a display or nearer the center of the user 150's visual field (such as when the user 150 is distracted or is undergoing heavy exertion, causing their visual field to be effectively narrowed). In other embodiments, the PM 180 may be configured to modify audio presentation of information. For example, the PM 180 may be configured to change the volume and/or pitch of audio information, such as when the user 150 is in a noisy environment. In yet other embodiments, the PM 180 may be configured to modify haptic presentation of information, such as by causing the haptic device 193 to give stronger bursts of haptic feedback when the user is likely to be distracted. In other embodiments, the PM 180 may be configured to perform other modifications to presentation of information to the user 150.

Figure 2:
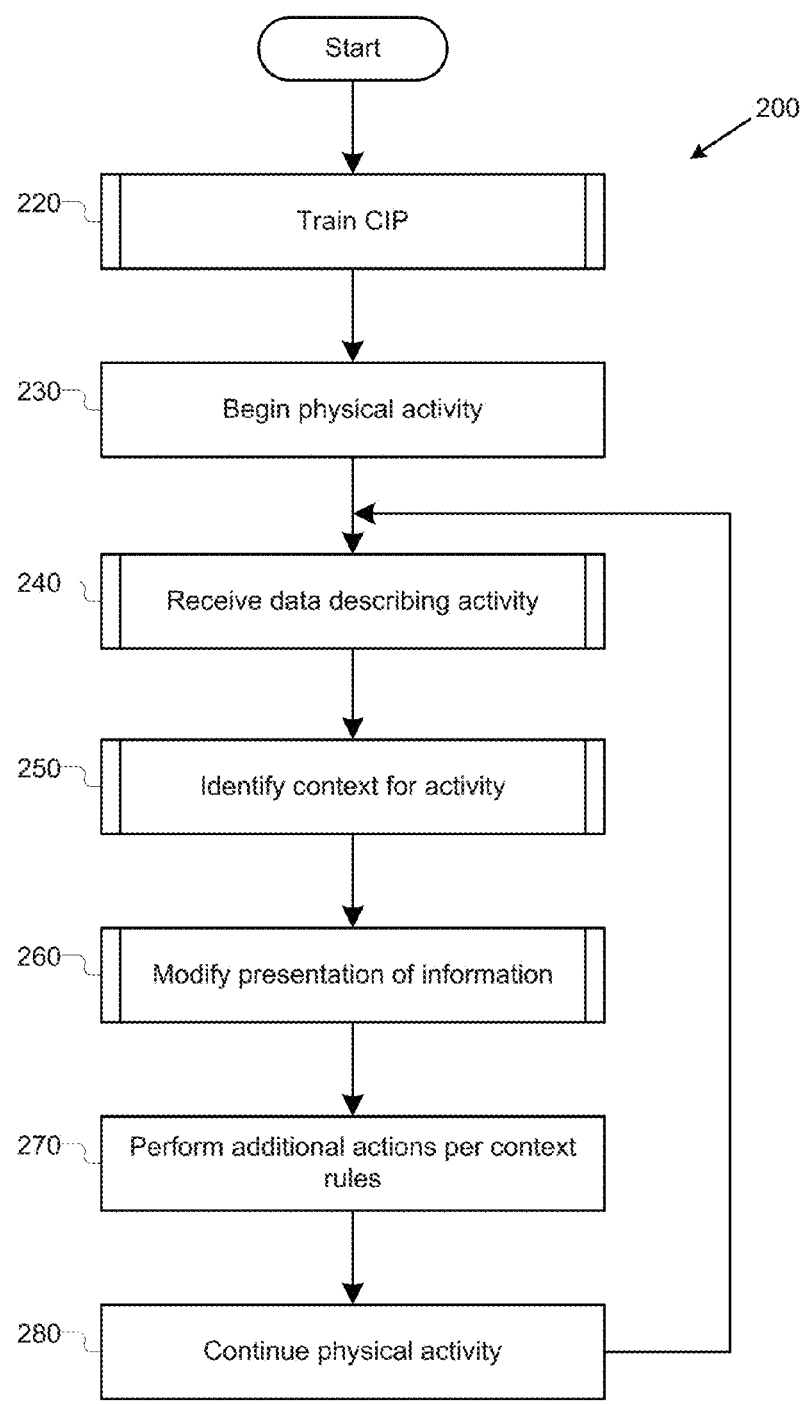
FIG. 2 illustrates an example process for context-based information presentation, in accordance with various embodiments.

Referring now to FIG. 2, an example process 200 for context-based information presentation is illustrated in accordance with various embodiments. While FIG. 2 illustrates particular operations in a particular order, in various embodiments the operations may be combined, split into parts, and/or omitted. The process may begin at operation 220, where the CIP 100 may be trained to identify contexts and modify presentation of information based on received data describing physical activities of users. Particular examples of operation 220 are described below with reference to process 300 of FIG. 3. Next, at operation 230, the user 150 may begin a physical activity. In various embodiments, the physical activity may be an exercise activity, such as biking, running, swimming, hiking, skateboarding, etc. In other embodiments, the physical activity may be operation of a vehicle, such as driving or flying a plane. In other embodiments, performance of other physical activities may be facilitated by the techniques described herein.

Next, at operation 240, the CIP 100 may receive data describing the physical activity, such as from one or more sensors 110-140. Particular examples of operation 240 are described below with reference to process 400 of FIG. 4. Next, at operation 250, the CIP 100 may identify one or more contexts for the physical activity, such as through activity of the context identifier 170. Particular examples of operation 250 are described below with reference to process 500 of FIG. 5. Next, at operation 260, the CIP 100 may modify presentation of information related to the physical activity, such as through activity of the PM 180. Particular examples of operation 260 are described below with reference to process 600 of FIG. 6.

Next, at operation 270, the CIP may perform (or request) additional activities according to application of context rules 190. Thus, in the examples given above, the CIP may request that phone calls or messages be stored if they are not being presented to the user 150. In another example, the CIP may request for a GPS to store data based on proximity to a location. In yet another example, the CIP may cause a rear-facing camera to activate based on danger to the user. In various embodiments, other activities may be requested. Next at operation 280, the physical activity may be continued by the user 150 and the process may repeat at operation 240 to continue to monitor the physical activity of the user 150 and to modify presentation of information to the user 150. After operation 280, the process may repeat at operation 240 for additional receipt of data, determination of context, and modification of presentation of information to the user 150. Alternatively, the process may then end.

Figure 3:
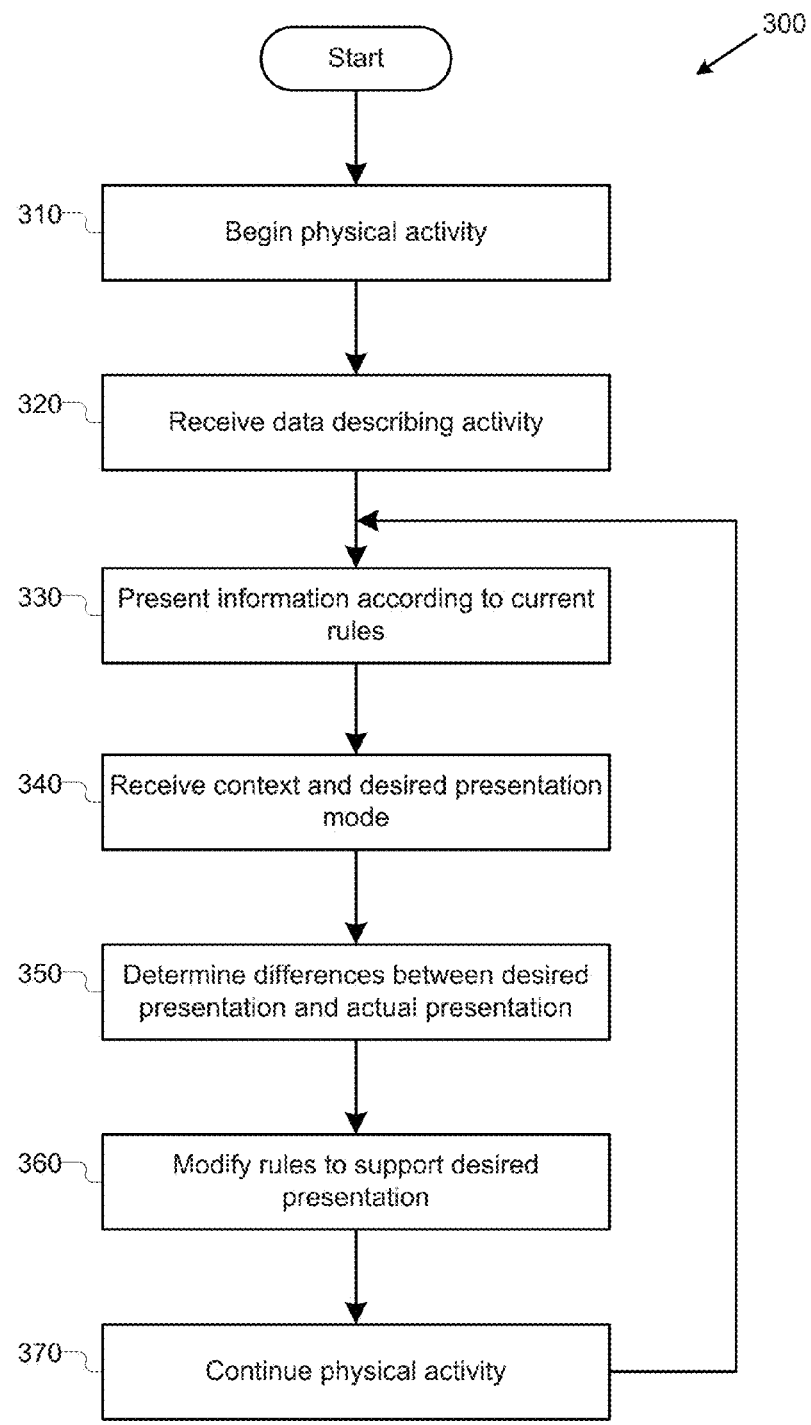
FIG. 3 illustrates an example process for training a context-based information presentation system, in accordance with various embodiments.

FIG. 3 illustrates an example process 300 for training a context-based information presentation system, in accordance with various embodiments. While FIG. 3 illustrates particular operations in a particular order, in various embodiments the operations may be combined, split into parts, and/or omitted. Process 300 may include one or more implementations of operation 220 of process 200 of FIG. 2. In various embodiments, the training process of FIG. 3 may utilize one or more initial context rules. These context rules may be generate prior to training, such as by utilizing an initial set of context rules that may be generated according to predicted or assumed desires of the user 150. In other embodiments, the context rules may be set by the user 150, such as through user preferences, prior to performing training. In yet other embodiments, the user 150 may select from one or more sets of predetermined context rules.

The process may begin at operation 310, where the user 150 may begin a physical activity. In various embodiments, the physical activity may be an exercise activity and/or operation of a vehicle, such as in the examples provided above. Next, at operation 320, the input interface 160 of the CIP 100 may receive data describing the activity. As discussed above, in various embodiments, the data may include routing data, physical data, environmental data, equipment data, etc. Next, at operation 330, the CIP 100, such as through activity of the context identifier 170 may identify contexts according to a current set of context rules 190, and the presentation modifier 180 may modify presentation of information according to the identified context. Particular examples of modification of presentation of information are described below with reference to FIGS. 5 and 6.

Next, at operation 340, the context identifier 170 of the CIP 100 may receive indications of a current context and desired presentation mode. For example, the CIP 100 may receive an indication of a context from a user that the user is (or has been) exercising heavily, or is currently navigating, is searching for a turn, etc. The CIP 100 may also receive absolute indications of what presentation mode, such as "visual only" or "audio only". In other embodiments, the CIP 100 may receive relative indications, such as "louder audio", "brighter video", etc.

Next, at operation 350, the CIP 100, such as through activity of the context identifier 170, may determine differences between the desired presentation and the actual presentation performed, and, at operation 360 may modify the context rules 190 to support the desired presentation. Particular embodiments of modification to the context rules 190 based on comparison of desired presentation and context to the actual presentation may be based at least in part on principles of cognitive, perceptual processing in humans and the effects of attention-overload on vigilance & detection in stressful or exertion-affected conditions.

Next, at operation 370, the user 150 may continue the physical activity and the process may repeat at operation 330 to further continue training. Alternatively, the process may end.

Figure 4:
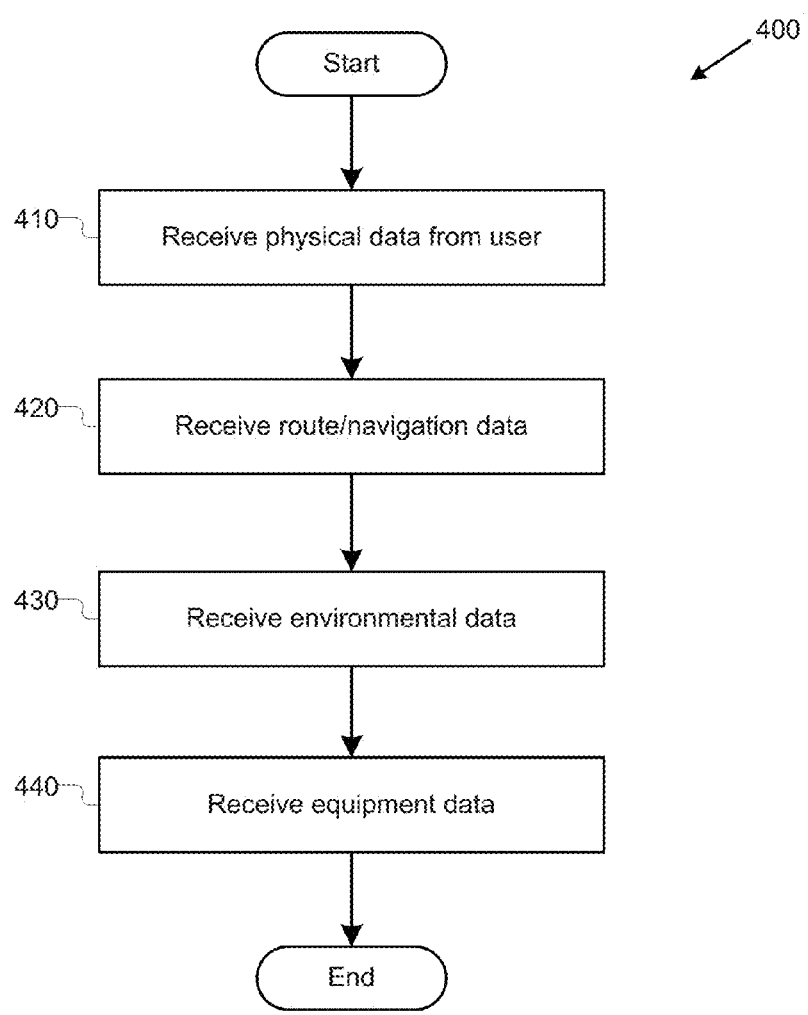
FIG. 4 illustrates an example process for receiving information describing a physical activity, in accordance with various embodiments.

FIG. 4 illustrates an example process 400 for receiving information describing a physical activity, in accordance with various embodiments. While FIG. 4 illustrates particular operations in a particular order, in various embodiments the operations may be combined, split into parts, and/or omitted. Process 400 may include one or more implementations of operation 240 of process 200 of FIG. 2. The process may begin at operation 410, where the input interface 160 may receive physical data from a user 150 and/or from sensors associated with and/or worn by the user 150. As discussed above, in various embodiments, the physical data may include such as heart rate, breathing rate, head orientation, skin conditions (such as galvanic resistance changes due to sweat) etc. In various embodiments, the input interface 160 may receive this physical data from one or more physical sensors 120 attached to the user 150 and/or to equipment used by the user 150. Next, at operation 420, the input interface 160 may receive route/navigation data, such as speed, route plan, traffic conditions, etc. Such route/navigation data may be received from a CPS or other navigation sensor 110. Next, at operation 430, the input interface 160 may receive environmental data, such as temperature, ambient noise, ambient light level and/or light and/or color in the viewing direction of the user 150. In various embodiments, such environmental data may be received from one or more environmental sensors 130 that may be attached to the user 150 and/or equipment of the user 150. Next, at operation 440, the input interface 160 may receive equipment data for equipment of the user 150, such as speed, gear choice, pedaling cadence, shoe strike position or cadence, breaking usage, etc. It may be noted that, while process 400 describes particular types of data in a particular order, in other embodiments, other types of data may be received by the input interface 160 and used by the CIP 100.

Figure 5:
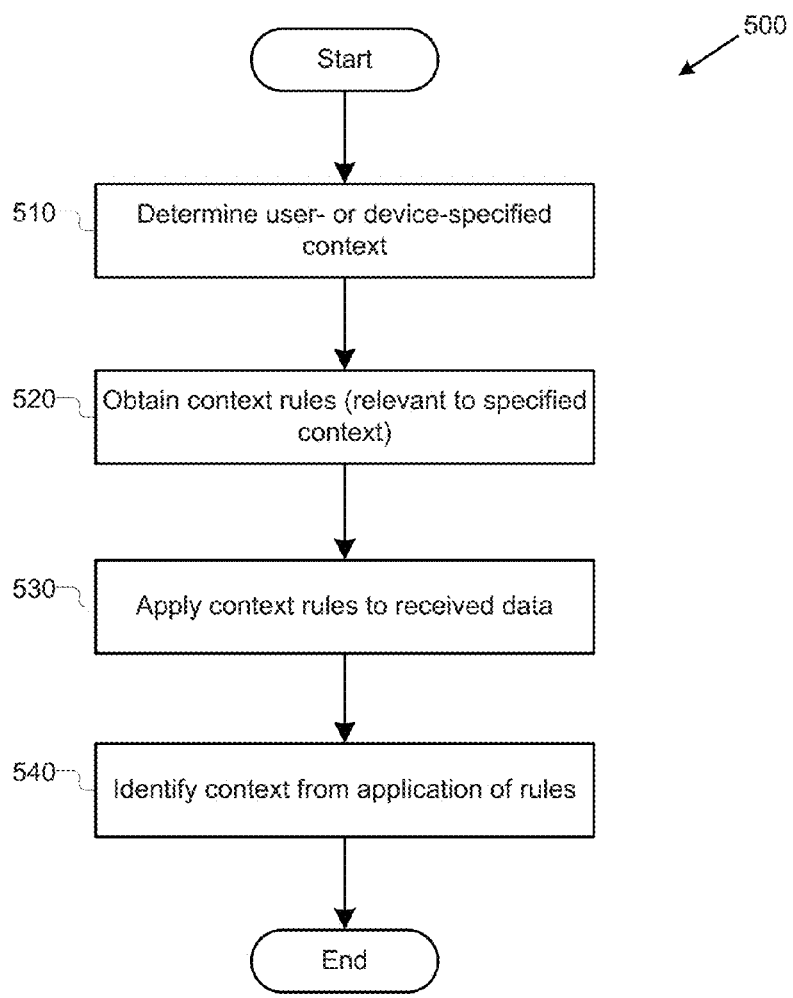
FIG. 5 illustrates an example process for determining context for a physical activity, in accordance with various embodiments.

FIG. 5 illustrates an example process 500 for determining context for a physical activity, in accordance with various embodiments. While FIG. 5 illustrates particular operations in a particular order, in various embodiments the operations may be combined, split into parts, and/or omitted. Process 500 may include one or more implementations of operation 250 of process 200 of FIG. 2. The process may begin at operation 510, where the context identifier 170 may identify a user- or device-specified context. For example, the context identifier 170 may receive an indication that the user is participating in a training program that will include particular intervals of difficult or easier exercise. In another example, the context identifier 170 may receive an indication from a device, such as a GPS 110, that the user 150 is navigating to a destination, or from a training device, like a running watch or an application on a computer or smartphone, that the user 150 is participating in a training program.

Next, at operation 520, the context identifier 170 may obtain all or part of the stored context rules 190. In some embodiments, the context rules obtained at operation 520 may be those context rules that are relevant to the previously specified context. In other embodiments, the context rules obtained may be include additional rules that are not necessarily relevant to the specified context, but which may be nonetheless desirable to have if the context changes, such as based on received data. Next, at operation 530, the context identifier 170 may apply the obtained context rules to the received data. Various implementations of applications of context rules may be understood. At operation 540, based on the application of the context rules to the data, a context (or more than one context) may be identified. The operation may then end.

Figure 6:
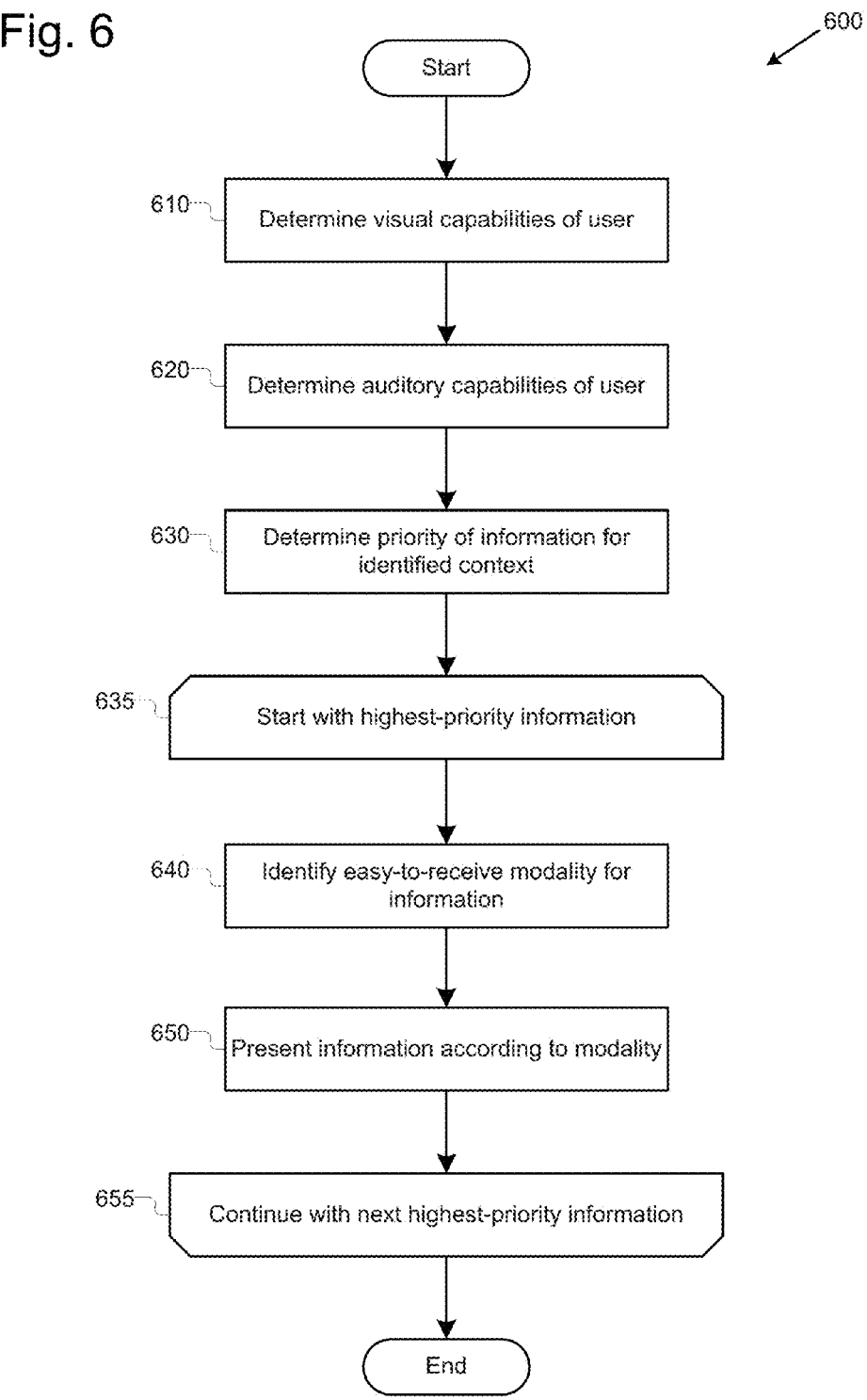
FIG. 6 illustrates an example process for modifying presentation of information based on context, in accordance with various embodiments.

FIG. 6 illustrates an example process for modifying presentation of information based on context, in accordance with various embodiments. While FIG. 6 illustrates particular operations in a particular order, in various embodiments the operations may be combined, split into parts, and/or omitted. Process 600 may include one or more implementations of operation 260 of process 200 of FIG. 2. The process may begin at operation 610, where the presentation modifier 180 may determine the visual capabilities of the user 150. For example, if a current context indicates that the user 150 is exerting themselves, then the presentation modifier may determine that the user 150 may not be able to concentrate on complex visual information, or may have a limited visual field. In another example, if a current context indicates a particular visual environment, for example, biking at night, the presentation modifier may determine that only brighter, higher-contrast colors may be visible to the user 150. Next, at operation 620, the presentation modifier 180 may determine the auditory capabilities of the user 150. For example, if a current context indicates that there is substantial noise, the presentation modifier 180 may determine that a minimum volume is required for audio presentation or that only particular frequencies should be used.

Next, at operation 630, the presentation modifier 180 may determine a priority of information based on the identified context. For example, during a training context, the presentation modifier 180 may determine that training-specific information (such as interval length, speed, heart rate, etc.) should be prioritized over less-crucial information, such as weather conditions direction, etc. In some embodiments, the presentation modifier 180 may determine that particular information may be prioritized regardless of a current context; for example, the presentation modifier 180 may determine that emergency weather warning should always take priority.

Next, at operation 635, the presentation modifier 180 may begin a loop with the highest priority information that is currently to be presented to the user 150. The presentation modifier 180 may then, at operation 640 identify an easier-to-receive modality for that information. In various embodiments, that easier-to-receive modality may be determined based on the determination of visual and auditory capabilities of the user. In some embodiments, the easier-to-receive modality may include haptic feedback, if that particular presentation modality is available/useful to the user 150. Next, at operation 650, the presentation modifier 180 may present information to the user 150 according to the determined modality. As discussed, this may include visual, audio, and/or haptic information presentation. In various embodiments, the presentation may be modified from previously presented information presented in a similar modality, such as through modification of amount, speed, frequency range, color, placement, etc. of the information. In other embodiments, a different modality may be utilized. Next, at loop operation 655, the presentation modifier 180 may continue with the next highest-priority information. If there is no additional information to present, the process may then end.

Figure 7:
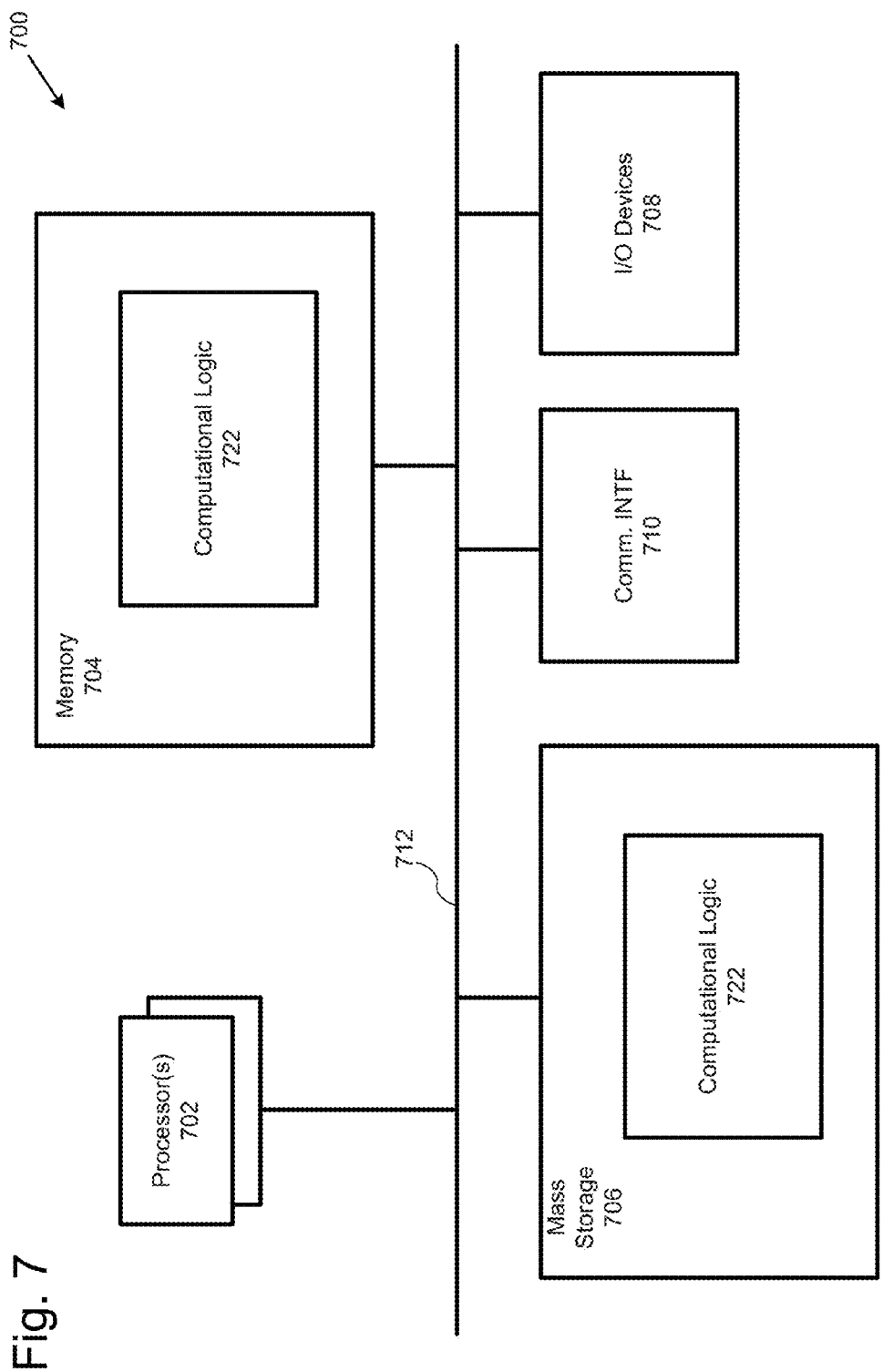
FIG. 7 illustrates an example computing environment suitable for practicing various aspects of the present disclosure, in accordance with various embodiments.

Referring now to FIG. 7, an example computer suitable for practicing various aspects of the present disclosure, including processes of FIGS. 2-6, is illustrated in accordance with various embodiments. As shown, computer 700 may include one or more processors or processor cores 702, and system memory 704. For the purpose of this application, including the claims, the terms "processor" and "processor cores" may be considered synonymous, unless the context clearly requires otherwise. Additionally, computer 700 may include mass storage devices 706 (such as diskette, hard drive, compact disc read only memory (CD-ROM) and so forth), input/output devices 708 (such as display, keyboard, cursor control, remote control, gaming controller, image capture device, and so forth) and communication interfaces 710 (such as network interface cards, modems, infrared receivers, radio receivers (e.g., Bluetooth, WiFi, Near Field Communications, Radio-frequency identification, and so forth). The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage devices 706 may be employed to store a working copy and a permanent copy of the programming instructions implementing one or more of the modules shown in FIG. 1, and/or the operations associated with techniques shown in FIGS. 2-6, collectively referred to as computing logic 722. The various elements may be implemented by assembler instructions supported by processor(s) 702 or high-level languages, such as, for example, C, that can be compiled into such instructions.

The permanent copy of the programming instructions may be placed into permanent storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices. In embodiments, the programming instructions may be stored in one or more computer readable non-transitory storage media. In other embodiments, the programming instructions may be encoded in transitory storage media, such as signals.

The number, capability and/or capacity of these elements 710-712 may vary. Their constitutions are otherwise known, and accordingly will not be further described.

Figure 8:
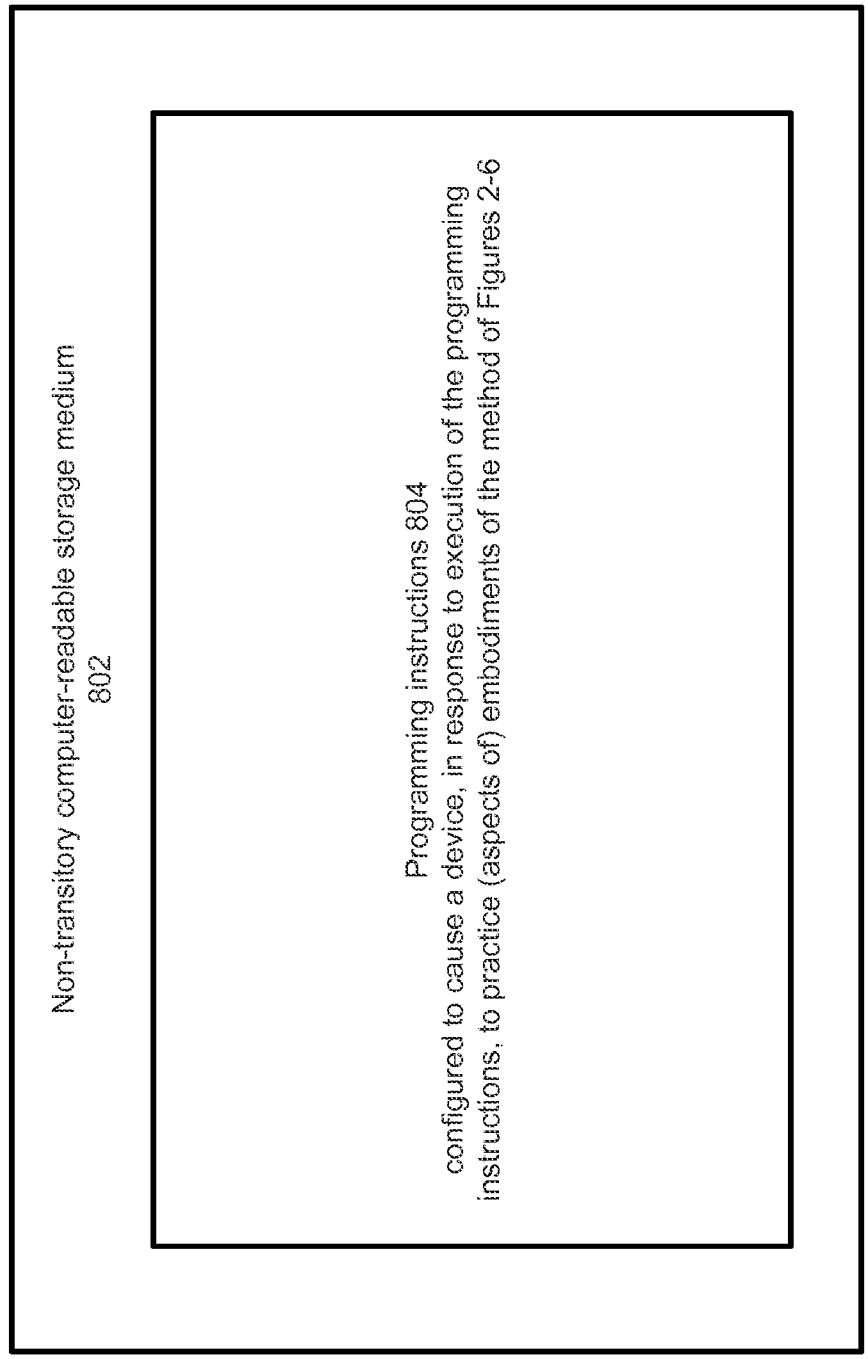
FIG. 8 illustrates an example storage medium with instructions configured to enable an apparatus to practice various aspects of the present disclosure, in accordance with various embodiments.

FIG. 8 illustrates an example least one computer-readable storage medium 802 having instructions configured to practice all or selected ones of the operations associated with the techniques earlier described, in accordance with various embodiments. As illustrated, least one computer-readable storage medium 802 may include a number of programming instructions 804. Programming instructions 804 may be configured to enable a device, e.g., computer 700, in response to execution of the programming instructions, to perform, e.g., various operations of processes of FIGS. 2-6, e.g., but not limited to, to the various operations performed to perform facilitation of transactions. In alternate embodiments, programming instructions 804 may be disposed on multiple least one computer-readable storage media 802 instead.

Referring back to FIG. 7, for one embodiment, at least one of processors 702 may be packaged together with computational logic 722 configured to practice aspects of processes of FIGS. 2-6. For one embodiment, at least one of processors 702 may be packaged together with computational logic 722 configured to practice aspects of processes of FIGS. 2-6 to form a System in Package (SiP). For one embodiment, at least one of processors 702 may be integrated on the same die with computational logic 722 configured to practice aspects of processes of FIGS. 2-6. For one embodiment, at least one of processors 702 may be packaged together with computational logic 722 configured to practice aspects of processes of FIGS. 2-6 to form a System on Chip (SoC). For at least one embodiment, the SoC may be utilized in, e.g., but not limited to, a computing tablet. (e.g., WiFi, Blue Tooth, Blue Tooth Low Energy, Near Field Communications, Radio-frequency identification (RFID), etc.) and other components as necessary to meet functional and non-functional requirements of the system.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 includes an apparatus equipped to provide context-based information to a user. The apparatus includes: an input interface to receive data describing physical activity of a user being performed external to the apparatus; a context identifier coupled to the input interface to identify, based at least in part on the data, a context for the physical activity being performed by the user; and a presentation modifier coupled to the context identifier to modify, based at least in part on the context identified, presentation of information to the user while the user performs the activity, wherein modify presentation of information includes switch a mode of presentation for at least one piece of the information between sensory modalities.

Example 2 includes the apparatus of example 1, wherein switch a mode of presentation for at least one piece of the information between sensory modalities includes switch the mode of presentation between visual and auditory modalities.

Example 3 includes the apparatus of any of examples 1-2, wherein switch a mode of presentation for at least one piece of the information between sensory modalities includes switch the mode of presentation from or to a haptic presentation of information.

Example 4 includes the apparatus of any of examples 1-3, wherein the input interface is to receive data about audio proximate to the user while the user performs the activity.

Example 5 includes the apparatus of any of examples 1-4, wherein the input interface is to receive data about movements or orientation of the user while the user performs the activity.

Example 6 includes the apparatus of any of examples 1-5, wherein the input interface is to receive biometric data for the user while the user performs the activity.

Example 7 includes the apparatus of any of examples 1-6, wherein:
the apparatus further includes one or more sensors coupled to the input interface; and
the input interface is further to receive the data from the one or more sensors.

Example 8 includes the apparatus of any of examples 1-7, wherein the context identifier is to determine a level of physical activity of the user.

Example 9 includes the apparatus of any of examples 1-8, wherein the context identifier is to determine that the user is utilizing navigation services.

Example 10 includes the apparatus of any of examples 1-9, wherein the context identifier is to determine weather conditions proximate to the user.

Example 11 includes the apparatus of any of examples 1-10, wherein the context identifier is to determine that the user is performing a training program.

Example 12 includes the apparatus of any of examples 1-11, wherein the context identifier is to determine a cognitive or perceptual load of the user.

Example 13 includes the apparatus of any of examples 1-12, wherein the presentation modifier is to modify a volume level or frequency range of auditory information.

Example 14 includes the apparatus of any of examples 1-13, wherein the presentation modifier is to modify speed at which information is presented.

Example 15 includes the apparatus of any of examples 1-14, wherein the presentation modifier is to modify a placement of presentation of visual information.

Example 16 includes the apparatus of any of examples 1-15, wherein the presentation modifier includes one or more of an audio presentation device or an image presentation device.

Example 17 includes the apparatus of any of examples 1-16, wherein the physical activity is one or more of bicycling, running skiing, snowboarding, or hiking.

Example 18 includes one or more computer-readable storage media containing instructions written thereon to provide context-based information to a user. The instructions are to, in response to execution by a computing device, cause the computing device to: receive data describing physical activity of a user being performed external to the apparatus; identify, based at least in part on the information, a context for the physical activity being performed by the user; and modify, based at least in part on the context identified, presentation of information to the user while the user performs the activity, wherein modify presentation of information includes switch a mode of presentation for at least one piece of the information between sensory modalities.

Example 19 includes the computer-readable media of example 18, wherein switch a mode of presentation for at least one piece of the information between sensory modalities includes switch the mode of presentation between visual and auditory modalities.

Example 20 includes the computer-readable media of any of examples 18-19, wherein switch a mode of presentation for at least one piece of the information between sensory modalities includes switch the mode of presentation from or to a haptic presentation of information.

Example 21 includes the computer-readable media of any of examples 18-20, wherein receive data includes receive data about audio proximate to the user while the user performs the activity.

Example 22 includes the computer-readable media of any of examples 18-21, wherein receive data includes receive data about movements or orientation of the user while the user performs the activity.

Example 23 includes the computer-readable media of any of examples 18-22, wherein receive data includes receive biometric data for the user while the user performs the activity.

Example 24 includes the computer-readable media of any of examples 18-23, wherein receive data includes receive data from one or more sensors coupled to the computing device.

Example 25 includes the computer-readable media of any of examples 18-24, wherein identify a context includes determine a level of physical activity of the user.

Example 26 includes the computer-readable media of any of examples 18-25, wherein identify a context includes determine that the user is utilizing navigation services.

Example 27 includes the computer-readable media of any of examples 18-26, wherein identify a context includes determine weather conditions proximate to the user.

Example 28 includes the computer-readable media of any of examples 18-27, wherein identify a context includes determine that the user is performing a training program.

Example 29 includes the computer-readable media of any of examples 18-28, wherein identify a context includes determine a cognitive or perceptual load of the user.

Example 30 includes the computer-readable media of any of examples 18-29, wherein modify presentation includes modify a volume level or frequency range of auditory information.

Example 31 includes the computer-readable media of any of examples 18-30, wherein modify presentation includes modify speed at which information is presented.

Example 32 includes the computer-readable media of any of examples 18-31, wherein modify presentation includes modify a placement of presentation of visual information.

Example 33 includes the computer-readable media of any of examples 18-32, wherein the computing device includes one or more of an audio presentation device or an image presentation device.

Example 34 includes the computer-readable media of any of examples 18-33, wherein the physical activity is one or more of bicycling, running skiing, snowboarding, or hiking Example 35 includes a computer-implemented method for providing context-based information to a user. The method includes: receiving, by a computing system, data describing physical activity of a user being performed external to the apparatus; identifying, by the computing system, based at least in part on the information, a context for the physical activity being performed by the user; and modifying, by the computing system, based at least in part on the context identified, presentation of information to the user while the user performs the activity, wherein modifying presentation of information includes switching a mode of presentation for at least one piece of the information between sensory modalities.

Example 36 includes the method of example 35, wherein switching a mode of presentation for at least one piece of the information between sensory modalities includes switching the mode of presentation between visual and auditory modalities.

Example 37 includes the method of any of examples 35-36, wherein switching a mode of presentation for at least one piece of the information between sensory modalities includes switching the mode of presentation from or to a haptic presentation of information.

Example 38 includes the method of any of examples 35-37, wherein receiving data includes receiving data about audio proximate to the user while the user performs the activity.

Example 39 includes the method of any of examples 35-38, wherein receiving data includes receiving data about movements or orientation of the user while the user performs the activity.

Example 40 includes the method of any of examples 35-39, wherein receiving data includes receiving biometric data for the user while the user performs the activity.

Example 41 includes the method of any of examples 35-40, wherein receiving data includes receiving data from one or more sensors coupled to the computing device.

Example 42 includes the method of any of examples 35-41, wherein identifying a context includes determining a level of physical activity of the user.

Example 43 includes the method of any of examples 35-42, wherein identifying a context includes determining that the user is utilizing navigation services.

Example 44 includes the method of any of examples 35-43, wherein identifying a context includes determining weather conditions proximate to the user.

Example 45 includes the method of any of examples 35-44, wherein identifying a context includes determining that the user is performing a training program.

Example 46 includes the method of any of examples 35-45, wherein identifying a context includes determining a cognitive or perceptual load of the user.

Example 47 includes the method of any of examples 35-46, wherein modifying presentation includes modifying a volume level or frequency range of auditory information.

Example 48 includes the method of any of examples 35-47, wherein modifying presentation includes modifying speed at which information is presented.

Example 49 includes the method of any of examples 35-48, wherein modifying presentation includes modifying a placement of presentation of visual information.

Example 50 includes the method of any of examples 35-49, wherein the computing system includes one or more of an audio presentation device or an image presentation device.

Example 51 includes the method of any of examples 35-50, wherein the physical activity is one or more of bicycling, running skiing, snowboarding, or hiking.

Example 52 includes an apparatus for providing context-based information to a user. The apparatus includes: means for receiving data describing physical activity of a user being performed external to the apparatus; means for identifying based at least in part on the information, a context for the physical activity being performed by the user; and means for modifying based at least in part on the context identified, presentation of information to the user while the user performs the activity, wherein means for modifying presentation of information includes means for switching a mode of presentation for at least one piece of the information between sensory modalities.

Example 53 includes the apparatus of example 52, wherein means for switching a mode of presentation for at least one piece of the information between sensory modalities includes means for switching the mode of presentation between visual and auditory modalities.

Example 54 includes the apparatus of any of examples 52-53, wherein means for switching a mode of presentation for at least one piece of the information between sensory modalities includes means for switching the mode of presentation from or to a haptic presentation of information.

Example 55 includes the apparatus of any of examples 52-54, wherein means for receiving data includes means for receiving data about audio proximate to the user while the user performs the activity.

Example 56 includes the apparatus of any of examples 52-55, wherein means for receiving data includes means for receiving data about movements or orientation of the user while the user performs the activity.

Example 57 includes the apparatus of any of examples 52-56, wherein means for receiving data includes means for receiving biometric data for the user while the user performs the activity.

Example 58 includes the apparatus of any of examples 52-57, wherein means for receiving data includes means for receiving data from one or more sensors coupled to the computing device.

Example 59 includes the apparatus of any of examples 52-58, wherein means for identifying a context includes means for determining a level of physical activity of the user.

Example 60 includes the apparatus of any of examples 52-59, wherein means for identifying a context includes means for determining that the user is utilizing navigation services.

Example 61 includes the apparatus of any of examples 52-60, wherein means for identifying a context includes means for determining weather conditions proximate to the user.

Example 62 includes the apparatus of any of examples 52-61, wherein means for identifying a context includes means for determining that the user is performing a training program.

Example 63 includes the apparatus of any of examples 52-62, wherein means for identifying a context includes means for determining a cognitive or perceptual load of the user.

Example 64 includes the apparatus of any of examples 52-63, wherein means for modifying presentation includes means for modifying a volume level or frequency range of auditory information.

Example 65 includes the apparatus of any of examples 52-64, wherein means for modifying presentation includes means for modifying speed at which information is presented.

Example 66 includes the apparatus of any of examples 52-65, wherein means for modifying presentation includes means for modifying a placement of presentation of visual information.

Example 67 includes the apparatus of any of examples 52-66, wherein the apparatus includes one or more of an audio presentation device or an image presentation device.

Example 68 includes the apparatus of any of examples 52-67, wherein the physical activity is one or more of bicycling, running skiing, snowboarding, or hiking.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus equipped to provide context-based information to a first driver, comprising:
 a driving computer coupled to equipment to be used by the first driver to operate a vehicle, the driving computer including:
 an input interface to:
 receive first data describing a first driving activity of the first driver at a first location;
 receive second data describing a second driving activity of a second driver, wherein the second driving activity of the second driver is performed at a second location and is to be collected via one or more sensors of a device associated with the second driver, wherein the first location and the second location are different locations;

a context identifier coupled to the input interface to identify, based respectively at least in part on the first and second data, a first context and a second context for the first and second driving activity being performed by the respective first driver and the second driver; and a presentation modifier coupled to the context identifier to modify, based at least in part on the first context identified, presentation of information to the first driver while the first driver performs the first driving activity, wherein to modify presentation of information comprises to switch a mode of presentation for at least one piece of the information between an auditory mode and a visual mode of presentation while the first driver performs the first driving activity, wherein the first driving activity includes utilization of navigation assistance by the first driver and the first context includes whether a route is to include an upcoming turn during the first driving activity.

2. The apparatus of claim 1, wherein the input interface is to receive information about audio proximate to the first driver while the first driver performs the first driving activity.

3. The apparatus of claim 1, wherein the first data and the second data include information about movements or orientation of the first driver and the second driver while the first driver and the second driver perform the respective first driving activity and second driving activity.

4. The apparatus of claim 1, wherein the input interface is to receive biometric data for the first driver while the first driver performs the first driving activity.

5. The apparatus of claim 1, wherein:
the apparatus further comprises one or more sensors coupled to the input interface; and
the input interface is further to receive the first data from the one or more sensors.

6. The apparatus of claim 1, wherein the context identifier is to determine a cognitive or perceptual load of the first driver.

7. The apparatus of claim 1, wherein the presentation modifier is to modify at least one of: a volume level or frequency range of auditory information; a speed at which information is presented; and a placement of presentation of visual information.

8. The apparatus of claim 1, wherein the presentation modifier comprises one or more of an audio presentation device or an image presentation device.

9. One or more non-transitory computer-readable storage media containing instructions written thereon to provide information to a first driver, the instructions to, in response to execution by a computing device, cause the computing device to: receive first data describing a first driving activity of the first driver being performed external to an apparatus and at a first location; receive second data to describe a second driving activity of a second driver being performed at a second location, different from the first location, and to be collected by a sensor array of a device associated with the second driver; identify, based at least in part on the respective first and second data, a respective first context and second context for the respective first and the second driving activity being performed by the respective first driver and the second driver; and modify, based at least in part on the first and the second context identified, presentation of information to the first driver while the first driver performs the first driving activity, wherein to modify presentation of information comprises to switch a mode of presentation for at least one piece of the information between a visual modality and an auditory modality of presentation of information while the first driver performs the first driving activity, wherein the first driving activity includes utilization of navigation assistance by the first driver and the first context includes whether a route is to include an upcoming turn during the first driving activity.

10. The non-transitory computer-readable storage media of claim 9, wherein to receive first data comprises to receive data about audio proximate to the first driver.

11. The non-transitory computer-readable storage media of claim 9, wherein to receive first data comprises to receive biometric data for the first driver while the first driver performs the first driving activity.

12. The non-transitory computer-readable storage media of claim 9, wherein to receive first data comprises to receive first data describing current weather conditions from one or more sensors coupled to the computing device.

13. The non-transitory computer-readable storage media of claim 9, wherein to identify the first context comprises to determine a cognitive or perceptual load of the first driver.

14. The non-transitory computer-readable storage media of claim 9, wherein to modify presentation of information comprises modify at least one of: a volume level or frequency range of auditory information; a speed at which information is presented; and a placement of presentation of visual information.

15. The non-transitory computer-readable storage media of claim 9, wherein the computing device comprises one or more of an audio presentation device or an image presentation device.

16. A computer-implemented method for providing information to a first driver, the method comprising: receiving, by a computing system, first data describing a first driving activity of the first driver being performed external to the computing system and at a first location; receiving, by the computing system, second data describing a second driving activity of a second driver being performed external to the computing system and at a second location; identifying, by the computing system, based at least in part on the information, a first and a second context for the respective first and second driving activity being performed by the respective first driver and the second driver, and wherein the first location and the second location are different locations; and modifying, by the computing system, based at least in part on the first context and second context identified, presentation of information to the first driver while the first driver performs the first driving activity, wherein modifying presentation of information comprises switching a mode of presentation for at least one piece of the information between a visual modality and an auditory presentation of information, wherein the first driving activity includes utilization of navigation assistance by the first driver and the first context includes whether a route is to include an upcoming turn during the first driving activity.

17. The method of claim 16, wherein receiving first data comprises receiving data about at least one of audio proximate to the first driver, movements, or orientation while the first driver performs the first driving activity.

18. The method of claim 16, wherein receiving the first data comprises receiving information from one or more sensors coupled to the computing system.

19. The method of claim 16, wherein identifying the first context comprises determining a cognitive or perceptual load of the first driver.

20. The method of claim 16, wherein the computing system comprises one or more of an audio presentation device or an image presentation device.

21. The apparatus of claim 1, further comprising a rear-facing camera to activate or deactivate based upon the mode of presentation switched to while the first driver performs the first driving activity.

22. The apparatus of claim 1, wherein the context identifier is to identify the first context for the first driving activity being performed by the first driver based at least in part on information to assess function of equipment used by the first driver.

23. The apparatus of claim 1, wherein the context identifier is to determine a cognitive or perceptual load of the second driver.

24. The apparatus of claim 1, wherein the first context and the second context include information about a respective level of traffic at the first location and the second location.

* * * * *